(12) United States Patent
Miller

(10) Patent No.: US 6,379,646 B1
(45) Date of Patent: *Apr. 30, 2002

(54) CRYSTALLINE PHOSPHORUS-CONTAINING MOLECULAR SIEVES

(75) Inventor: Stephen J. Miller, San Francisco, CA (US)

(73) Assignee: Chevron U.S.A. Inc., San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/877,267

(22) Filed: Jun. 17, 1997

(51) Int. Cl.⁷ .......................... C01B 37/08; C01B 39/20
(52) U.S. Cl. .................. 423/702; 423/705; 423/707; 423/712; 423/306; 423/DIG. 21; 423/DIG. 30; 502/214
(58) Field of Search ................. 423/702, 703, 423/704, 705, 706, 707, 708, 712, 305, 306, DIG. 30, DIG. 21; 502/214

(56) References Cited

U.S. PATENT DOCUMENTS

| | | | | |
|---|---|---|---|---|
| 4,247,524 A | * | 1/1981 | Leonard | 423/712 |
| 4,401,634 A | * | 8/1983 | Sun | 423/712 |
| 4,440,871 A | | 4/1984 | Lok et al. | 502/214 |
| 4,814,316 A | * | 3/1989 | Pellet et al. | 502/214 |
| 4,943,424 A | * | 7/1990 | Miller | 423/DIG. 30 |
| 4,970,183 A | * | 11/1990 | Nakamoto et al. | 502/68 |
| 5,064,828 A | * | 11/1991 | Chu | 423/DIG. 30 |
| 5,096,684 A | | 3/1992 | Guth et al. | 423/306 |
| 5,178,846 A | | 1/1993 | Buelow et al. | 423/710 |
| 5,264,203 A | * | 11/1993 | Beck et al. | 423/703 |
| 5,378,670 A | | 1/1995 | Kumar | 502/60 |
| 5,576,258 A | | 11/1996 | Chamberlain et al. | 502/73 |
| 5,675,050 A | * | 10/1997 | Des Courieres et al. | 585/533 |

FOREIGN PATENT DOCUMENTS

| | | | | |
|---|---|---|---|---|
| EP | 022 620 | * | 1/1981 | 423/DIG. 30 |
| EP | 0185525 A2 | | 6/1986 | |
| EP | 0396085 A2 | | 11/1990 | |
| EP | 0406872 A2 | | 1/1991 | |
| GB | 1188584 | * | 4/1970 | 423/DIG. 30 |
| SU | 1130527 | * | 12/1984 | 423/DIG. 30 |

OTHER PUBLICATIONS

Lok et al. "Silicoaluminophosphate Molecular Sieves: Another New Classs of Microporous Crystalline Inorganic Solids," J. Am. Chem. Soc., 1984, 106, 6092–93, 1984.*
Meier et al., Atlas of Zeolite Structure Types, p. 96–7 1992, 1987.*
Ojo, A.F., Dwyer, J, Dewing, J. & Karim, K., Synthesis and Properties of SAPO–37, J. Chem. Soc. Faraday trans., 87(16), 1991, 2679–2680. (No month).
de Saldarriaga, L.S., Saldarriaga, C. & Davis, M. E. , Investigations into the Nature of a Silicoaluminophosphate, J. Am. Chem. Soc., 1987, 109, 2686–2687. (No month).

* cited by examiner

*Primary Examiner*—David Sample
(74) *Attorney, Agent, or Firm*—Richard J. Sheridan; Steven R. Ellinwood

(57) ABSTRACT

Molecular sieves comprising (1) phosphorus oxide; (2) a first oxide comprising an oxide of silicon, germanium or mixtures thereof; and (3) a second oxide comprising an oxide of aluminum, boron or mixtures thereof, said molecular sieve having a mole ratio of the first oxide to the second oxide of greater than 1, containing at least about 10 weight percent phosphorus oxide in the crystal framework, and having pores greater than 5 Å in diameter are useful as catalysts in hydrocarbon conversion reactions.

18 Claims, No Drawings

CRYSTALLINE PHOSPHORUS-CONTAINING MOLECULAR SIEVES

BACKGROUND OF THE INVENTION

1. Field of the Invention

The present invention relates to new crystalline, phosphorus-containing molecular sieves, a method for preparing them using a zeolite, and processes employing a catalyst containing them.

2. State of the Art

Because of their unique sieving characteristics, as well as their catalytic properties, crystalline molecular sieves are especially useful in applications such as hydrocarbon conversion. Although many different crystalline molecular sieves have been disclosed, there is a continuing need for new materials with desirable properties for hydrocarbon and chemical conversions, and other applications.

SUMMARY OF THE INVENTION

The present invention is directed to a family of crystalline, phosphorus-containing molecular sieves. The molecular sieves of this invention have some characteristics of zeolites (such as a relatively high mole ratio of silica to alumina in the crystal structure) as well as some characteristics of silicoaluminophosphates (such as having a relatively high phosphorus content in the crystal structure). Because of this duality of characteristics, the crystalline, phosphorus-containing molecular sieves of this invention are termed "zeophosphates" herein.

In accordance with this invention, there is provided a crystalline molecular sieve composition comprising (1) phosphorus oxide; (2) a first oxide comprising an oxide of silicon, germanium or mixtures thereof; and (3) a second oxide comprising an oxide of aluminum, boron or mixtures thereof, said molecular sieve having a mole ratio of the first oxide to the second oxide of greater than 1, containing at least about 10 weight percent phosphorus oxide in the crystal framework, and having pores greater than 5 Å in diameter. The molecular sieves of this invention can have a mole ratio of the first oxide to the second oxide of about 3 or greater, e.g., from about 10 to about 30. The molecular sieves may have the FAU crystal structure.

Further provided by the present invention is an improved method for preparing a molecular sieve comprising (1) phosphorus oxide; (2) a first oxide comprising an oxide of silicon, germanium or mixtures thereof; and (3) a second oxide comprising an oxide of aluminum, boron or mixtures thereof by contacting under crystallization conditions a mixture comprising one or more active sources of said oxides with one or more templating agent capable of forming said molecular sieve, the improvement comprising including a zeolite containing the first oxide and second oxide in the mixture of oxides. The present invention also provides such a method wherein the zeolite is a source of the first oxide and second oxide. The present invention also includes such a method wherein the first oxide is silicon oxide and the second oxide is aluminum oxide. Further provided in accordance with this invention is such a method wherein the zeolite is Y zeolite, and such a method wherein the Y zeolite has a first oxide/second oxide mole ratio of less than about 30, e.g., less than about 15 or less than about 12. Also provided in accordance with this invention is such a process wherein the Y zeolite has an alkali metal content of less than about 1 weight percent. The method of this invention may be conducted such that the mixture used to form the molecular sieve has a starting pH of at least 5. Further provided in accordance with this invention is such a method wherein the molecular sieve formed has the FAU crystal structure.

The present invention also provides such a method wherein the molecular sieve formed has a mole ratio of the first oxide to the second oxide of greater than 1, e.g., 3 or greater, and contains at least about 10 weight percent, e.g., about 10 to about 25 weight percent, phosphorus oxide in the crystal framework.

The present invention additionally provides a process for converting hydrocarbons comprising contacting a hydrocarbonaceous feed at hydrocarbon converting conditions with a catalyst comprising a zeophosphate of this invention.

Further provided by the present invention is a hydrocracking process comprising contacting a hydrocarbon feedstock under hydrocracking conditions with a catalyst comprising a zeophosphate of this invention, preferably predominantly in the hydrogen form.

Also included in this invention is a process for increasing the octane of a hydrocarbon feedstock to produce a product having an increased aromatics content comprising contacting a hydrocarbonaceous feedstock which comprises normal and slightly branched hydrocarbons having a boiling range above about 40° C. and less than about 200° C., under aromatic conversion conditions with a catalyst comprising a zeophosphate of this invention made substantially free of acidity by neutralizing said zeophosphate with a basic metal. Also provided in this invention is such a process wherein the zeophosphate contains a Group VIII metal component.

Also provided by the present invention is a catalytic cracking process comprising contacting a hydrocarbon feedstock in a reaction zone under catalytic cracking conditions in the absence of added hydrogen with a catalyst comprising a zeophosphate of this invention, preferably predominantly in the hydrogen form. Also included in this invention is such a catalytic cracking process wherein the catalyst additionally comprises a large pore crystalline cracking component.

The present invention further provides an isomerizing process for isomerizing $C_4$ to $C_7$ hydrocarbons, comprising contacting a catalyst, comprising at least one Group VIII metal and a zeophosphate of this invention, preferably predominantly in the hydrogen form, with a feed having normal and slightly branched $C_4$ to $C_7$ hydrocarbons under isomerizing conditions.

This invention also provides a process for alkylating an aromatic hydrocarbon which comprises contacting under alkylation conditions at least a mole excess of an aromatic hydrocarbon with a $C_2$ to $C_{20}$ olefin under at least partial liquid phase conditions and in the presence of a catalyst comprising a zeophosphate of this invention, preferably predominantly in the hydrogen form.

This invention additionally provides a process for transalkylating an aromatic hydrocarbon which comprises contacting under transalkylating conditions an aromatic hydrocarbon with a polyalkyl aromatic hydrocarbon under at least partial liquid phase conditions and in the presence of a catalyst comprising a zeophosphate of this invention, preferably predominantly in the hydrogen form.

This invention also provides a process for converting lower alcohols and other oxygenated hydrocarbons comprising contacting said lower alcohol or other oxygenated hydrocarbon with a catalyst comprising a zeophosphate of this invention, preferably predominantly in the hydrogen form, under conditions to produce liquid products.

Further provided in accordance with this invention is a process for isomerizing an isomerization feed comprising an aromatic $C_8$ stream of xylene isomers or mixtures of xylene isomers and ethylbenzene, wherein a more nearly equilibrium ratio of ortho-, meta and para-xylenes is obtained, said process comprising contacting said feed under isomerization conditions with a catalyst comprising a zeophosphate of this invention, preferably predominantly in the hydrogen form.

The present invention further provides a process for oligomerizing olefins comprising contacting an olefin feed under oligomerization conditions with a catalyst comprising a zeophosphate of this invention, preferably predominantly in the hydrogen form.

Also provided by the present invention is an improved process for the reduction of oxides of nitrogen contained in a gas stream in the presence of oxygen wherein said process comprises contacting the gas stream with a molecular sieve, the improvement comprising using as the molecular sieve a zeophosphate of this invention. The zeophosphate may contain a metal or metal ions capable of catalyzing the reduction of the oxides of nitrogen, and may be conducted in the presence of a stoichiometric excess of oxygen. In a preferred embodiment, the gas stream is the exhaust stream of an internal combustion engine.

Among other factors, the present invention is based on the discovery that crystalline, phosphorus-containing molecular sieves having some characteristics of zeolites while at the same time having some characteristics of silicoaluminophosphates ("SAPO's") can be made by using a zeolite in the mixture used to prepare the molecular sieves. In particular, it has unexpectedly been found that the molecular sieves of this invention have a relatively high silica to alumina mole ratio (compared to most SAPO's) as well as having a relatively high phosphorus content in the crystal structure (compared to zeolites). It has been found that the zeophosphates of this invention have good crystallinity, and are more active catalytically than the zeolite used in the mixture from which the zeophosphate is made.

The differences between the zeophosphates of this invention and typical SAPO's is illustrated by comparing a SAPO having the faujasite crystal structure (e.g., SAPO-37) and a zeophosphate having the faujasite crystal structure. Typical SAPO-37 has a silica to alumina mole ratio of about 0.3–0.5 whereas the zeophosphate has a silica to alumina mole ratio greater than 1. SAPO-37 is not stable in water, losing crystallinity in the presence of water. Quite unexpectedly, it has been found that the zeophosphate has excellent hydrothermal stability, and does not lose significant crystallinity when steamed or added to water. This means that the zeophosphate can have metals, e.g., platinum, impregnated on it using aqueous solutions. This can not be done with SAPO-37. Finally, it has been found that the zeophosphate does not lose porosity (as determined by argon micropore volume measurements) when exposed to water.

DETAILED DESCRIPTION OF THE INVENTION

The zeophosphates of the present invention comprise (1) phosphorus oxide; (2) a first oxide comprising an oxide of silicon, germanium or mixtures thereof; and (3) a second oxide comprising an oxide of aluminum, boron or mixtures thereof, said molecular sieve having a mole ratio of the first oxide to the second oxide of greater than 1, containing at least about 10 weight percent phosphorus oxide in the crystal framework, and having pores greater than 5 Å in diameter. For the sake of simplicity, the following description of the aeophosphates of this invention will be limited to the case where the first oxide is silicon and the second oxide is aluminum, i.e., where the zeophosphate is a silicoaluminophosphate.

The zeophosphates of this invention are generally synthesized by hydrothermal crystallization from a reaction mixture comprising reactive sources of silicon, aluminum and phosphorus, one or more organic templating agents capable of forming the desired zeophosphate and a zeolite. While not being limited by any theory, it is believed that the zeolite can serve as a source of silicon and aluminum and/or as a structure directing agent.

The zeophosphates of this invention are preferably prepared from a reaction mixture having a mole fraction of alkali metal cation which is sufficiently low that it does not interfere with the formation of the zeophosphate.

The preferred compositional parameters for the reaction mixture employed to prepare the zeophosphates, expressed as molar ratios of oxides, are:

|  | General | Preferred |
| --- | --- | --- |
| R/Second oxide ($Al_2O_3$) | 0.2:1–8:1 | 0.3–4:1 |
| $P_2O_5$/Second oxide ($Al_2O_3$) | 0.6:1–2:1 | 0.8:1–1.5:1 |
| 1st oxide($SiO_2$)/2nd oxide($Al_2O_3$) | 1:1–40:1 | 1:1–10:1 |
| $H_2O$/Second oxide ($Al_2O_3$) | 4:1–500:1 | 10:1–200:1 | where R is the organic templating agent or agents. It should also be noted that in the above table, silicon oxide represents the first oxide and could be replace by germanium oxide or a mixture of silicon and germanium oxides, and aluminum oxide represents the second oxide and could be replaced by boron oxide or a mixture of aluminum and boron oxides.

The reaction mixture contains one or more organic templating agent(s) ("template") which is capable of forming the zeophosphates of this invention. Typically, the template is a quaternary ammonium compound. Examples of such templates include, but are not limited to, tetraethylammonium hydroxide ("TEAOH"), tetrapropylammonium hydroxide ("TPAOH"), tetramethylammonium hydroxide ("TMAOH"), or, preferably when the desired zeophosphate has the FAU crystal structure, a mixture of TPAOH and TMAOH.

As noted above, it is believed that the zeolite in the reaction mixture may be a source of silicon oxide and/or aluminum oxide. However, it may be necessary or desirable to add an additional source of silicon oxide and/or aluminum oxide. The preferred source of aluminum oxide for the zeophosphates of this invention is an aluminum alkoxide or hydroxide such as aluminum isopropoxide or pseudo-boehmite. Typical sources of silicon oxide include silicates, silica hydrogel, silicic acid, colloidal silica, tetraalkyl orthosilicates, and silica hydroxides. Phosphoric acid is the preferred source of phosphorus, though organic phosphates can also be employed as the phosphorus source.

The zeolite employed in the mixture used to prepare the zeophosphates should be comprised of silicon oxide and aluminum oxide. The zeolite should have a relatively high amount of aluminum oxide. Typically, the silica/alumina mole ratio of the zeolite should be about 4 to about 30, preferably about 4 to about 15, more preferably about 4 to about 12. It is also critical that the amount of alkali metal in the zeolite be low enough that it does not interfere with the formation of the zeophosphate. Normally, an alkali metal content of less than about 1 weight percent is low enough to avoid interference with the reaction.

The zeolite typically will have the same crystal structure as the zeophosphate which is to be made. Examples of zeolites which are useful in practicing the present invention include, but are not limited to, zeolites having the FAU (faujasite) crystal structure, such as Y zeolite.

At least 10%, preferably at least 20%, of the total silica in the reaction mixture is supplied by the zeolite.

Prior to crystallization of the reaction mixture, it is critical that the pH of the mixture be adjusted to at least about 5, preferably from about 5 to about 9. If the reaction mixture has a starting pH lower than about 5 (e.g., about 2), the zeolite may dissolve and the zeophosphate not form. Adjustment of the pH is generally accomplished by a sufficient amount of a compatible acid, i.e., an acid which does not interfere with the synthesis of the zeophosphate. Suitable compatible acids include, but are not limited to, mineral acids such as hydrochloric acid, nitric acid, sulfric acid and the like.

The reaction mixture is placed in a sealed pressure vessel, preferably lined with an inert material such as polytetrafluoroethylene, and heated, preferably under autogenous pressure, at a temperature of at least about 100° C., preferably between 100° C. and about 250° C., more preferably between about 125° C. and about 225° C., until crystals of the zeophosphate are formed. Typically, a period of from about 4 hours to about 4 days is sufficient for crystallization of the zeophosphate. While not essential to the synthesis of the zeophosphate, in general, stirring or other moderate agitation of the reaction mixture facilitates the crystallization procedure. The product is recovered by any conventional method, such as centrifugation or filtration.

After crystallization, the zeophosphate may be isolated and washed with water and dried in air. As a result of the hydrothermal crystallization, the as-synthesized zeophosphate may contain within its pore system at least some of the organic templating agent used in the reaction mixture. This organic templating agent may be removed by a post-treatment process, such as by calcining the as-synthesized zeophosphate at temperatures between about 200° C. and about 700° C. so as to thermally degrade the template.

It has unexpectedly been found that the zeophosphates of this invention contain more phosphorus in the crystal framework than is normally found in zeolites, while at the same time having a higher silica/alumina mole ratio than is found in SAPO's. Thus, the zeophosphates of this invention contain at least about 10, preferably about 10 to about 30, weight percent phosphorus oxide in the crystal framework. When the zeolite used to prepare the zeophosphate is Y zeolite, and the zeophosphate produced has the FAU structure, the zeophosphate will have an average phosphorus oxide content of about 14–21 weight percent.

The silica/alumina mole ratio of the zeophosphates typically will average greater than 1, preferably 3 or greater, preferably about 3 to about 6. Typically, the zeophosphates will contain about 15 to about 40 weight percent $Al_2O_3$ (second oxide) and about 30 to about 75 weight percent $SiO_2$ (first oxide).

The phosphorus oxide content and silica/alumina mole ratios for the zeophosphates is expressed in terms of an average value, because these values may vary from crystal to crystal. In the case of the phosphorus oxide, for example, all of the zeophosphate crystals will contain phosphorus oxide, but the content in individual crystals may vary such that the average phosphorus oxide content in the entire product will be at least 10 weight percent.

The zeophosphates of this invention may contain other elements in their three dimensional framework, such as magnesium, zinc, chromium, cobalt, chromium, titanium and the like. See U.S. Pat. No. 4,793,984, which is incorporated by reference herein in its entirety.

It has also been unexpectedly found that the zeophosphates of this invention are highly stable to water. They can be exposed to water, such as by steaming or by impregnating metals onto the zeophosphate using an aqueous solution of the metal, without losing a significant amount of their crystallinity. Typically, upon treatment in wet air at about 750° C. for about four hours, the zeophosphate will retain at least 80%, preferably at least 90% of its crystallinity. This is contrasted with, e.g., SAPO-37, which is not stable in water and loses its crystallinity when exposed to water.

Catalysts containing the zeophosphates of this invention in combination with at least one hydrogenation component, such as platinum, palladium, tungsten, vanadium, molybdenum, nickel, cobalt, chromium, and manganese are excellent catalysts. Such catalysts generally comprise the zeophosphate and from about 0.01% to about 10%, preferably about 0.1 wt % to about 5 wt %, of the hydrogenation component, the percentages being by weight based on the weight of the zeophosphate. Preferred hydrogenation components are platinum and palladium, and, when employed, are preferably employed between about 0.1% and about 1.5%.

Techniques for introducing catalytically active metals into the zeophosphate are disclosed in the literature. See, for example, U.S. Pat. Nos. 3,236,761; 3,226,339; 3,236,762; 3,620,960; 3,373,109; 4,202,996 and 4,440,871 which are incorporated by reference herein in their entirety.

The physical form of the zeophosphate-containing catalyst depends on the type of reactor being employed and may be in the form of a granule or powder, and is desirably compacted into a more readily usable form (e.g., larger agglomerates), usually with a silica or alumina binder for fluidized bed reactions, or pills, prills, spheres, extrudates, or other shapes of controlled size to accord adequate catalyst-reactant contact.

The zeophosphate may also be composited with other materials resistant to the temperatures and other conditions employed in the catalyzed process. The catalyst may be composited with porous inorganic oxide matrix materials and mixtures of matrix materials. Examples of these two types of materials can be found in U.S. Pat. No. 5,230,881, issued Jul. 27, 1993 to Miller, which is incorporated by reference herein in its entirety.

Hydrocarbon Conversion Processes

The zeophosphates of this invention are useful in hydrocarbon conversion reactions. Hydrocarbon conversion reactions are chemical and catalytic processes in which carbon-containing compounds are changed to different carbon-containing compounds. Examples of hydrocarbon conversion reactions in which the zeophosphates are expected to be useful include hydrocracking, catalytic cracking, alkylation, and olefin and aromatics formation reactions. The catalysts are also expected to be useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating (including allation of aromatics by other hydrocarbons), isomerizing polyalkyl substituted aromatics (e.g., m-xylene), and disproportionating aromatics (e.g., toluene) to provide mixtures of benzene, xylenes and higher methylbenzenes and oxidation reactions. Also included are rearrangement reactions to make various naphthalene derivatives. The zeophosphates have high selectivity, and under hydrocarbon conversion conditions can provide a high percentage of desired products relative to total products.

The zeophosphates can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, synthetic paraffins from NAO, recycled plastic feedstocks and, in general, can be any carbon-containing feedstock susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using the catalyst of this invention containing a metal, e.g., a Group VIII metal such platinum, include hydrogenation-dehydrogenation reactions, denitrogenation and desulfurization reactions.

The following table indicates typical reaction conditions which may be employed when using catalysts comprising the zeophosphates of this invention in the hydrocarbon conversion reactions of this invention. Preferred conditions are indicated in parentheses.

| Process | Temp., ° C. | Pressure | LHSV |
|---|---|---|---|
| Hydrocracking | 175–485 | 0.5–350 bar | 0.1–30 |
| Aromatics formation | 400–600 (480–550) | atm.-10 bar | 0.1–15 |
| Cat. cracking | 127–885 | subatm.-[1] (atm.-5 atm.) | 0.5–50 |
| Oligomerization | 232–649[2] 10–232[4] (27–204)[4] | 0.1–50 atm.[2,3] — — | 0.2–50[2] 0.05–20[5] (0.1–10)[5] |
| Condensation of alcohols | 260–538 | 0.5–1000 psig | 0.5–50[5] |
| Isomerization | 93–538 (204–315) | 50–1000 psig | 1–10 (1–4) |
| Xylene isomerization | 260–593[2] (315–566)[2] 38–371[4] | 0.5–50 atm.[2] (1–5 atm)[2] 1–200 atm.[4] | 0.1–100[5] (0.5–50)[5] 0.5–50 |

[1]Several hundred atmospheres
[2]Gas phase reaction
[3]Hydrocarbon partial pressure
[4]Liquid phase reaction
[5]WHSV Other reaction conditions and parameters are provided below.

Isomerization

The zeophosphates of this invention are useful in catalysts in a paraffin conversion process which provides selective conversion of n-paraffins to branched paraffins. During processing, the n-paraffins undergo isomerization reactions to yield iso-paraffin products with minor cracking reactions occurring. The n-paraffins become isomerized to iso-paraffins to form liquid range materials which contribute to a low viscosity, low pour point product in the case of middle distillates and lube oils, and high octane in the case of gasoline.

The isomerization process using the catalysts of this invention may be conducted by contacting the feed to be isomerized with a fixed stationary bed of catalyst, with a fixed fluidized bed, or with a transport bed, as desired. A simple configuration is a trickle-bed operation in which the feed is allowed to trickle through a stationary fixed bed, preferably in the presence of hydrogen. The isomerization conditions are dependent in large measure on the feed used and upon the desired product properties. Generally, the temperature will be between about 200° C. and about 475° C., preferably between about 250° C. and about 450° C. The pressure is typically between about 15 psig and about 3000 psig, preferably between about 200 psig and about 3000 psig. The liquid hourly space velocity will be from about 0.1 to about 20, preferably between about 0.2 and about 10.

Hydrogen is preferably present in the reaction zone during the isomerization process. The hydrogen to feed ratio is typically between about 500 and about 30,000 SCF/bbl, preferably about 1000 to about 20,000 SCF/bbl. Generally, hydrogen will be separated from the product and recycled to the reaction zone.

Hydrocracking

Using a catalyst which comprises a zeophosphate of this invention in the hydrogen form and a hydrogenation promoter, heavy petroleum residual feedstocks, cyclic stocks and other hydrocrackate charge stocks can be hydrocracked using the process conditions and catalyst components disclosed in U.S. Pat. No. 4,910,006, issued Mar. 20, 1990 to Zones et al., and U.S. Pat. No. 5,316,753, issued May 31, 1994 to Nakagawa, both of which are incorporated herein by reference in their entirety.

The hydrocracking catalysts contain an effective amount of at least one hydrogenation component of the type commonly employed in hydrocracking catalysts. The hydrogenation component is generally selected from the group of hydrogenation catalysts consisting of one or more metals of Group VIB and Group VIII, including the salts, complexes and solutions containing such. The hydrogenation catalyst is preferably selected from the group of metals, salts and complexes of platinum, palladium, rhodium, iridium, ruthenium and mixtures thereof or nickel, molybdenum, cobalt, tungsten, titanium, chromium and mixtures thereof. Reference to the catalytically active metal or metals is intended to encompass such metal or metals in the elemental state or in some form such as an oxide, sulfide, halide, carboxylate and the like. The hydrogenation catalyst is present in an effective amount to provide the hydrogenation function of the hydrocracking catalyst, and preferably in the range of from 0.05 to 25% by weight.

Aromatics Formation

The zeophosphates can be used to convert light straight run naphthas and similar mixtures to highly aromatic mixtures. Thus, normal and slightly branched-chain hydrocarbons, preferably having a boiling range above about 40° C. and less than about 200° C., can be converted to products having a substantially higher octane aromatics content by contacting the hydrocarbon feed with a catalyst comprising a zeophosphate of this invention. It is also possible to convert heavier feeds into BTX or naphthalene derivatives of value using a catalyst comprising a zeophosphate of this invention.

The conversion catalyst preferably contains a Group VIII metal compound to have sufficient activity for commercial use. By Group VIII metal compound is meant the metal itself or a compound thereof Group VIII noble metals such as platinum, palladium, and iridium, or combinations thereof can be used. Rhenium or tin or a mixture thereof may also be used in conjunction with the Group VIII metal compound. The most preferred metal is platinum. The amount of Group VIII metal present in the conversion catalyst should be within the normal range of use in reforming catalysts, from about 0.05 to 2.0 weight percent, preferably 0.2 to 0.8 weight percent.

It is critical to the selective production of aromatics in useful quantities that the conversion catalyst be substantially free of acidity, for example, by neutralizing the zeophosphate with a basic metal, e.g., alkali metal, compound. Methods for rendering the catalyst free of acidity are known in the art. See the aforementioned U.S. Pat. Nos. 4,910,006 and 5,316,753 for a description of such methods. The preferred alkali metals are sodium, potassium, rubidium and cesium. The zeophosphate itself can be substantially free of acidity only at very high silica:alumina mole ratios.

Catalytic Cracking

Hydrocarbon cracking stocks can be catalytically cracked in the absence of hydrogen using the zeophosphates of this invention, preferably in the hydrogen form.

When a zeophosphate is used as a catalytic cracking catalyst in the absence of hydrogen, the catalyst may be employed in conjunction with traditional cracking catalysts, e.g., any aluminosilicate heretofore employed as a component in cracking catalysts. Typically, these are large pore, crystalline aluminosilicates. Examples of these traditional cracking catalysts are disclosed in the aforementioned U.S. Pat. Nos. 4,910,006 and 5,316,753. When a traditional cracking catalyst (TC) component is employed, the relative weight ratio of the TC to the zeophosphate is generally between about 1:10 and about 500:1, desirably between about 1:10 and about 200:1, preferably between about 1:2 and about 50:1, and most preferably is between about 1:1 and about 20:1. The zeophosphate and/or the traditional cracking component may be further ion exchanged with rare earth ions to modify selectivity.

The cracking catalysts are typically employed with an inorganic oxide matrix component. See the aforementioned U.S. Pat. Nos. 4,910,006 and 5,316,753 for examples of such matrix components.

Oligomerization

It is expected that the zeophosphates of this invention in the hydrogen form can also be used to oligomerize straight and branched chain olefins having from about 2 to 21 and preferably 2 to 5 carbon atoms. The oligomers which are the products of the process are medium to heavy olefins which are useful for both fuels, e.g., gasoline or a gasoline blending stock, and chemicals.

The oligomerization process comprises contacting the olefin feedstock in the gaseous or liquid phase with a catalyst comprising a zeophosphate of this invention. The zeophosphate can have the original cations associated therewith replaced by a wide variety of other cations according to techniques well known in the art. Typical cations would include hydrogen, ammonium, metal cations and mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel. One of the prime requisites is that the zeophosphate have a fairly low aromatization activity, i.e., in which the amount of aromatics produced is not more than about 20% by weight. This is accomplished by using a zeophosphate with controlled acid activity (alpha value) of from about 0.1 to about 120, preferably from about 0.1 to about 100, as measured by its ability to crack n-hexane. Alpha values are defined by a standard test known in the art, e.g., as shown in U.S. Pat. No. 3,960,978 issued on Jun. 1, 1976 to Givens, et al. which is incorporated totally herein by reference. If required, such zeophosphate may be obtained by steaming, by use in a conversion process or by any other method which may occur to one skilled in this art.

Condensation of Alcohols

The zeophosphates can be used to condense lower aliphatic alcohols having 1 to 10 carbon atoms to a gasoline boiling point hydrocarbon product comprising mixed aliphatic and aromatic hydrocarbon. The process disclosed in U.S. Pat. No. 3,894,107 issued Jul. 8, 1975 to Butter et al., describes the process conditions used in this process, which patent is incorporated totally herein by reference.

The catalyst may be in the hydrogen form or may be base exchanged or impregnated to contain ammonium or a metal cation complement, preferably in the range of from about 0.05 to 5% by weight. The metal cations that may be present include any of the metals of the Groups I through VIII of the Periodic Table. However, in the case of Group IA metals, the cation content should in no case be so large as to effectively inactivate the catalyst, nor should the exchange be such to eliminate all acidity. There may be other processes involving treatment of oxygenated substrates where a basic catalyst is desired.

Isomerization

The present catalyst may be used for isomerizing $C_4$ to $C_7$ hydrocarbons. The process comprises contacting the isomerization catalyst, i.e., a catalyst comprising a zeophosphate in the hydrogen form, with a hydrocarbon feed under isomerization conditions. The feed is preferably a light straight run fraction, boiling within the range of 30° F. (−1° C.) to 250° F. (121° C.) and preferably from 60° F. (15° C.) to 200° F. (93° C.). Preferably, the hydrocarbon feed for the process comprises a substantial amount of $C_4$ to $C_7$ normal and slightly branched low octane hydrocarbons, more preferably $C_5$ and $C_6$ hydrocarbons.

It is preferable to carry out the isomerization reaction in the presence of hydrogen. Preferably, hydrogen is added to give a hydrogen to hydrocarbon ratio ($H_2$/HC) of between 0.5 and 10 $H_2$/HC, more preferably between 1 and 8 $H_2$/HC. See the aforementioned U.S. Pat. Nos. 4,910,006 and 5,316,753 for a further discussion of isomerization process conditions.

A low sulfur feed is especially preferred in the present process. The feed preferably contains less than 10 ppm, more preferably less than 1 ppm, and most preferably less than 0.1 ppm sulfur. In the case of a feed which is not already low in sulfur, acceptable levels can be reached by hydrogenating the feed in a presaturation zone with a hydrogenating catalyst which is resistant to sulfur poisoning. See the aforementioned U.S. Pat. Nos. 4,910,006 and 5,316,753 for a further discussion of this hydrodesulfurization process.

It is preferable to limit the nitrogen level and the water content of the feed. Catalysts and processes which are suitable for these purposes are known to those skilled in the art.

After a period of operation, the catalyst can become deactivated by sulfur or coke. See the aforementioned U.S. Pat. Nos. 4,910,006 and 5,316,753 for a further discussion of methods of removing this sulfur and coke, and of regenerating the catalyst.

The conversion catalyst preferably contains a Group VIII metal compound to have sufficient activity for commercial use. By Group VIII metal compound is meant the metal itself or a compound thereof. Platinum, palladium, and iridium, or combinations thereof can be used. Rhenium and tin may also be used in conjunction with the noble metal. The most preferred metal is platinum. The amount of Group VIII metal present in the conversion catalyst should be within the normal range of use in isomerizing catalysts, from about 0.05 to 2.0 weight percent, preferably 0.2 to 0.8 weight percent.

Alkylation and Transalkylation

The zeophosphates can be used in a process for the alkylation or transalkylation of an aromatic hydrocarbon. The process comprises contacting the aromatic hydrocarbon with a $C_2$ to $C_{16}$ olefin alkylating agent or a polyalkyl aromatic hydrocarbon transalkylating agent, under at least partial liquid phase conditions, and in the presence of a catalyst comprising a zeophosphate.

The zeophosphates can also be used for removing benzene from gasoline by alkylating the benzene as described above and removing the alkylated product from the gasoline.

For high catalytic activity, the zeophosphate should be predominantly in its hydrogen form. It is preferred that, after calcination, at least 80% of the cation sites are occupied by hydrogen ions and/or rare earth ions.

Examples of suitable aromatic hydrocarbon feedstocks which may be alkylated or transalkylated by the process of the invention include aromatic compounds such as benzene, toluene and xylene. The preferred aromatic hydrocarbon is benzene. There may be occasions where naphthalene derivatives may be desirable. Mixtures of aromatic hydrocarbons may also be employed.

Suitable olefins for the alkylation of the aromatic hydrocarbon are those containing 2 to 20, preferably 2 to 4, carbon atoms, such as ethylene, propylene, butene-1, trans-butene-2 and cis-butene-2, or mixtures thereof. There may be instances where pentenes are desirable.

The preferred olefins are ethylene and propylene. Longer chain alpha olefins may be used as well.

When transalkylation is desired, the transalkylating agent is a polyalkyl aromatic hydrocarbon containing two or more alkyl groups that each may have from 2 to about 4 carbon atoms. For example, suitable polyalkyl aromatic hydrocarbons include di-, tri- and tetra-alkyl aromatic hydrocarbons, such as diethylbenzene, triethylbenzene, diethylmethylbenzene (diethyltoluene), di-isopropylbenzene, di-isopropyltoluene, dibutylbenzene, and the like. Preferred polyalkyl aromatic hydrocarbons are the dialkyl benzenes. A particularly preferred polyalkyl aromatic hydrocarbon is di-isopropylbenzene.

When alkylation is the process conducted, reaction conditions are as follows. The aromatic hydrocarbon feed should be present in stoichiometric excess. It is preferred that the molar ratio of aromatics to olefins be greater than four-to-one to prevent rapid catalyst fouling. The reaction temperature may range from 100° F. to 600° F. (38° C. to 315° C.), preferably 250° F. to 450° F. (121° C. to 232° C.). The reaction pressure should be sufficient to maintain at least a partial liquid phase in order to retard cayalyst fouling. This is typically in the range of about 50 psig to 1000 psig depending on the feedstock and reaction temperature. Contact time may range from 10 seconds to 10 hours, but is usually from 5 minutes to an hour. The weight hourly space velocity (WHSV), in terms of grams (pounds) of aromatic hydrocarbon and olefin per gram (pound) of catalyst per hour, is generally within the range of about 0.5 to 50.

When transalkylation is the process conducted, the molar ratio of aromatic hydrocarbon will generally range from about 1:1 to 25:1, and preferably from about 2:1 to 20:1. The reaction temperature may range from about 100° F. to 600° F. (38° C. to 315° C.), but it is preferably about 250° F. to 450° F. (121° C. to 232° C.). The reaction pressure should be sufficient to maintain at least a partial liquid phase, typically in the range of about 50 psig to 1000 psig, preferably 300 psig to 600 psig. The weight hourly space velocity will range from about 0.1 to 10. U.S. Pat. No. 5,082,990 issued on Jan. 21, 1992 to Hsieh, et al. describes such processes and is incorporated herein by reference.

Xylene Isomerization

Zeophosphates in the hydrogen form may also be useful in a process for isomerizing one or more xylene isomers in a $C_8$ aromatic feed in which the relative amounts of ortho-, meta- and para-xylene are in a non-equilibrium state to obtain ortho-, meta-, and para-xylene in a ratio approaching the equilibrium value. In particular, xylene isomerization is used in conjunction with a separate process to manufacture para-xylene. For example, a portion of the para-xylene in a mixed $C_8$ aromatics stream may be recovered by crystallization and centrifugation. The mother liquor from the crystallizer is then reacted under xylene isomerization conditions to restore ortho-, meta- and para-xylenes to a near equilibrium ratio. At the same time, part of the ethylbenzene in the mother liquor is converted to xylenes or to products which are easily separated by filtration. The isomerate is blended with fresh feed and the combined stream is distilled to remove heavy and light by-products. The resultant $C_8$ aromatics stream is then sent to the crystallizer to repeat the cycle.

Optionally, isomerization in the vapor phase is conducted in the presence of 3.0 to 30.0 moles of hydrogen per mole of alkylbenzene (e.g., ethylbenzene). If hydrogen is used, the catalyst should comprise about 0.1 to 2.0 wt % of a hydrogenation/dehydrogenation component selected from Group VIII (of the Periodic Table) metal component, especially platinum or nickel. By Group VIII metal component is meant the metals and their compounds such as oxides and sulfides.

Optionally, the isomerization feed may contain 10 to 90 wt % of a diluent such as toluene, trimethylbenzene, naphthenes or paraffins.

Other Uses for Zeophosphates

The zeophosphates can also be used as an adsorbent with high selectivities based on molecular sieve behavior and also based upon preferential hydrocarbon packing within the pores.

The zeophosphates may also be used for the catalytic reduction of the oxides of nitrogen in a gas stream. Typically the gas stream also contains oxygen, often a stoichiometric excess thereof. Also, the zeophosphate may contain a metal or metal ions within or on it which are capable of catalyzing the reduction of the nitrogen oxides. Examples of such metals or metal ions include copper, cobalt and mixtures thereof.

One example of such a process for the catalytic reduction of oxides of nitrogen in the presence of a molecular sieve is disclosed in U.S. Pat. No. 4,297,328, issued Oct. 27, 1981 to Ritscher et al., which is incorporated by reference herein.

There, the catalytic process is the combustion of carbon monoxide and hydrocarbons and the catalytic reduction of the oxides of nitrogen contained in a gas stream, such as the exhaust gas from an internal combustion engine. The molecular sieve used is metal ion-exchanged, doped or loaded sufficiently so as to provide an effective amount of catalytic copper metal or copper ions within or on the zeolite. In addition, the process is conducted in an excess of oxidant, e.g., oxygen. The zeophosphates of this invention can be used similarly.

EXAMPLES

The following examples demonstrate but do not limit the present invention.

Example 1

Synthesis of Y-Type Zeophosphate SM-5

400 Grams of 86% $H_3PO_4$ solution is placed in a stainless steel beaker in an ice bath. To this is added 328 grams of ice with mixing. 400 Grams of aluminum isopropoxide (Al $(OC_3H_7)_3$) plus 320 grams of ice is then added slowly with mixing using a Polytron homogenizer. 800 Grams of a 40% aqueous solution of tetrapropylammonium hydroxide ("TPAOH") is then added slowly with mixing followed by 16 grams of a 25% aqueous solution of tetramethylammonium hydroxide ("TMAOH") and another 360 grams of ice. Next, 388 grams of a low-Na stabilized Y zeolite (LZ-20, purchased from UOP) is added. The chemical composition of the Y zeolite is 71.0 wt % $SiO_2$, 21.0 wt % $Al_2O_3$, 8.0 wt % $H_2O$, and it has a $SiO_2/Al_2O_3$ mole ratio of 5.7. Another 800 grams of 40% TPAOH solution is added slowly with mixing followed by another 16 grams of 25% TMAOH solution. Then 32 grams of fumed silica (Cab-O-Sil M-5) is added with mixing. The mixture has a pH of 9.2 and the following composition, expressed in molar ratios of oxides:

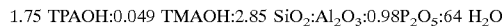

1.75 TPAOH:0.049 TMAOH:2.85 $SiO_2$:$Al_2O_3$:0.98$P_2O_5$:64 $H_2O$

71% of the resulting mixture (2526 grams, designated Mix A) is placed in a stainless steel liner in a 1-gallon stirred auotclave and heated for two days at 190° C. and autogenous pressure. The remainder of the mixture (designated Mix B) is placed in a 1-quart Teflon bottle in a stainless steel pressure vessel and heated for two days at 190° C. and autogenous pressure without stirring. The pH for both mixtures at the conclusion of this treatment is 7.3. Supernatant liquid is removed and the products filtered, washed with water, dried overnight in a vacuum oven at 120° C., and calcined in air for 8 hours at 593° C. Total weight (volatiles free) of calcined sieve recovered is 427 grams, with 69% coming from the stirred autoclave.

Both calcined products are analyzed by X-ray diffraction (XRD). The product from Mix B shows primarily the diffraction pattern for FAU with a minor AFI impurity. The product from Mix A shows only the FAU pattern, and has the following anhydrous molar composition, based on elemental analysis:

3.4 $SiO_2$:$Al_2O_3$:0.58 $P_2O_5$

SEM analysis of the product, designated "SM-5", shows it to be composed of crystals mostly less than 0.5 micron in diameter. Energy Dispersive X-ray (EDX) analysis of the sample in a Transmission Electron Microscope (TEM) detects $P_2O_5$ at levels between about 9 and 28 weight percent, with most of the particles containing about 14 weight percent $P_2O_5$, and with a silica/alumina mole ratio of about 3.

The calcined product is also analyzed by solid-state $^{31}P$ NMR. This shows a single peak at −26.2 ppm, indicative of tetrahedral phosphorus in a FAU structure coordinated through oxygen to four aluminum atoms (C. S. Blackwell, et al., J. Phys. Chem., 92, 3965 (88)).

Example 2

The SM-5 zeophosphate prepared in Example 1 is treated (steamed) at 760° C. for four hours with flowing nitrogen saturated with water at room temperature. Retention of crystallinity upon steaming is determined by comparing the total area of the XRD lines listed in Table I below with that for the product before steaming. This shows that 96% of the crystallinity is preserved.

TABLE I

XRD LINES FOR SM-5 USED TO DETERMINE CRYSTALLINITY

| Two Theta, degrees |
| --- |
| 15.70 |
| 18.74 |
| 20.42 |
| 23.72 |
| 27.12 |
| 30.84 |
| 31.49 |
| 35.76 |

Example 3

Hydrocracking

The SM-5 zeophosphate prepared in Example 1 is impregnated with 0.5 weight percent Pt and tested in a high pressure pilot plant for hydrocracking the heavy neutral lube oil (denitrified) described in Table II below which has already been through one stage of hydrocracking. Run conditions are 580° F. (304° C.), 4.6 WHSV, 1950 psig total pressure, and 8 MSCF/bbl once-through hydrogen. At 48 hours onstream, the conversion below 700° F. (371° C.) is 40%, where conversion is defined as:

$$\frac{g\ 700°\ F.+(feed) - 700°\ F.+(product)}{g\ 700°\ F.+(feed)} \times 100$$

TABLE II

| Heavy Neutral Lube Feed | |
| --- | --- |
| Gravity, API | 28.2 |
| Sulfur, ppm | 36 |
| Nitrogen, ppm | 3.5 |
| Pour Point, ° C. | +45 |
| Viscosity, 70° C., cSt | 28.57 |
| 100° C., cSt | 11.77 |
| Simulated Distillation, LV %, ° F. | |
| ST/5 | 799/841 |
| 10/30 | 868/925 |
| 50 | 967 |
| 70/90 | 1011/1080 |
| 95/EP | 1112/1149 |

Comparative Example 3A

Hydrocracking with Y Zeolite

A sample of the Y zeolite used to prepare the zeophosphate of Example 1 is also impregnated with 0.5% Pt and tested under the conditions of Example 4. At 48 hours onstream, the conversion below 700° F. (371° C.) is 34%.

Example 4

Hydroisomerization

The catalyst of Example 3 is tested for hydroisomerization of n-hexane at 400 psig, 1.9 WHSV, and 5.6 $H_2$/HC. Prior to fully pressurizing the unit, the catalyst is pre-sulfided at 500° F. (260° C.) and 50 psig by injecting $H_2S$ through a septum into the hydrogen stream above the reactor. At 26 hours onstream, conversion of n-hexane is 80% at a catalyst temperature of 571° F. (299° C.). The product distribution is shown in Table III below.

Comparative Example 4A

Hydroisomerization with Y Zeolite

The catalyst of Comparative Example 3A is also tested for n-hexane hydroisomerization under the conditions of Example 4. This catalyst is less active than that used in Example 4, requiring a higher temperature for 80% conversion of the n-hexane. Results are shown in Table III below.

Example 5

Hydroisomerization Using Steamed Zeophosphate

The steamed SM-5 zeophosphate of Example 2 is impregnated with 0.5 wt % Pt and tested for n-hexane isomerization under the same conditions as in Example 4. While activity is reduced somewhat, it is still comparable to that for unsteamed Y zeolite.

TABLE III

Hydroisomerization of n-Hexane at 400 psig, 1.9 WHSV and 5.6 $H_2$/HC

| Catalyst | Example 4 | Example 4A | Example 5 |
|---|---|---|---|
| Platinum, wt % | 0.5 | 0.5 | 0.5 |
| Time Onstream, hr. | 26 | 26 | 26 |
| Temperature, ° C. | 299 | 315 | 314 |
| Products, wt % | | | |
| $C_1$—$C_3$ | 0.5 | 0.6 | 0.8 |
| $C_4$ | 0.5 | 0.4 | 0.5 |
| $C_5$ | 0.7 | 0.6 | 0.8 |
| 2,2-DMB | 16.0 | 16.1 | 15.4 |
| 2,3-DMB | 8.3 | 8.4 | 8.2 |
| 2-MP | 32.3 | 31.9 | 31.9 |
| 3-MP | 21.7 | 21.7 | 21.7 |
| N—$C_6$ | 20.0 | 20.3 | 20.7 |

What is claimed is:

1. A homogenous, single-phase crystalline molecular sieve composition comprising (1) phosphorus oxide; (2) a first oxide comprising an oxide of silicon, germanium or mixtures thereof; and (3) a second oxide comprising an oxide of aluminum, boron or mixtures thereof, said molecular sieve having a mole ratio of the first oxide to the second oxide of greater than 1, containing at least about 10 weight percent phosphorus oxide in the crystal framework, having pores greater than 5 Å in diameter and having the FAU crystal structure.

2. The molecular sieve of claim 1 wherein the mole ratio of the first oxide to the second oxide is about 3 or greater.

3. The molecular sieve of claim 1 wherein the weight percent of phosphorus oxide in the crystal framework is from about 10 to about 30.

4. The molecular sieve of claim 1 wherein the weight percent of the first oxide in the crystal framework is from about 30 to about 75, and the weight percent of the second oxide in the crystal framework is from about 15 to about 40.

5. The composition of claim 1 wherein said composition is highly stable in water.

6. A hydrothermal crystallization method for preparing a homogeneous, single-phase molecular sieve comprising (1) phosphorus oxide; (2) a first oxide comprising an oxide of silicon, germanium or mixtures thereof; and (3) a second oxide comprising an oxide of aluminum, boron or mixtures thereof, said method comprising contacting under crystallization conditions a mixture comprising one or more active sources of said oxides with one or more templating agent capable of forming said molecular sieve, and a zeolite containing the first oxide and second oxide, wherein the molecular sieve has the FAU crystal structure, has a mole ratio of the first oxide to the second oxide of greater than 1, contains at least 10 weight percent phosphorus oxide in the crystal framework and has pores greater than 5 Angstroms in diameter, wherein the mixture used to form the molecular sieve has a starting pH of from about 5 to about 9, and wherein said molecular sieve is highly stable to water.

7. The method of claim 6 wherein the mixture comprises, in terms of molar ratios of oxides:

R/Second oxide 0.21:1–8:1

$P_2O_5$/Second oxide 06:1–2:1

First oxide/Second oxide 1:1–40:1

$H_2O$/Second oxide 4:1–500:1 where R is the organic templating agent or agents.

8. The method of claim 6 wherein the zeolite has the same crystal structure as the molecular sieve.

9. The method of claim 6 wherein the first oxide is silicon oxide and the second oxide is aluminum oxide.

10. The method of claim 6 wherein the zeolite is Y zeolite.

11. The method of claim 10 wherein the Y zeolite has a first oxide/second oxide mole ratio of less than about 30.

12. The method of claim 10 wherein the Y zeolite has a first oxide/second oxide mole ratio of less than 15.

13. The method of claim 10 wherein the Y zeolite has a first oxide/second oxide mole ratio of less than about 12.

14. The method of claim 10 wherein the Y zeolite has an alkali metal content of less than about 1 weight percent.

15. The method of claim 6 wherein the mole ratio of the first oxide to the second oxide is 3 or greater.

16. The method of claim 6 wherein the weight percent of phosphorus oxide in the crystal framework is from about 10 to about 25.

17. The method of claim 6 wherein the weight percent of the first oxide in the crystal framework is from about 30 to about 75, and the weight percent of the second oxide in the crystal framework is from about 15 to about 40.

18. A hydrothermal crystallization method for preparing a homogeneous, single-phase molecular sieve comprising (1) phosphorus oxide; (2) a first oxide comprising an oxide of silicon, germanium or mixtures thereof; and (3) a second oxide comprising an oxide of aluminum, boron or mixtures thereof, said method comprising contacting under crystallization conditions a mixture comprising one or more active sources of said oxides with one or more templating agent capable of forming said molecular sieve, and a zeolite containing the first oxide and second oxide, wherein the molecular sieve has the FAU crystal structure, has a mole ratio of the first oxide to the second oxide of greater than 1, contains at least 10 weight percent phosphorus oxide in the crystal framework and has pores greater than 5 Angstroms in diameter, and wherein the zeolite is a source of the first oxide and second oxide.

* * * * *